US009230039B2

(12) United States Patent  
Richard (10) Patent No.: US 9,230,039 B2
(45) Date of Patent: *Jan. 5, 2016

(54) ADAPTIVE DATA TRANSFORMATION ENGINE

(71) Applicant: Rateze Remote Mgmt. L.L.C., Wilmington, DE (US)

(72) Inventor: Philippe Richard, Las Vegas, NV (US)

(73) Assignee: Rateze Remote Mgmt. L.L.C., Wilmington, DE (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/223,936

(22) Filed: Mar. 24, 2014

(65) Prior Publication Data

US 2014/0297671 A1 Oct. 2, 2014

Related U.S. Application Data

(63) Continuation of application No. 11/188,095, filed on Jul. 22, 2005, now Pat. No. 8,719,326, which is a continuation-in-part of application No. 10/643,734, filed on Aug. 18, 2003, now abandoned, which is a (Continued)

(51) Int. Cl.
*G06F 15/16* (2006.01)
*G06F 17/30* (2006.01)
*H04L 9/32* (2006.01)

(52) U.S. Cl.
CPC ........ *G06F 17/30943* (2013.01); *H04L 9/3247* (2013.01); *H04L 2209/42* (2013.01); *H04L 2209/56* (2013.01); *H04L 2209/60* (2013.01); *H04L 2209/68* (2013.01); *H04L 2209/805* (2013.01)

(58) Field of Classification Search
CPC .................. H04L 9/3247; G06F 17/30943
USPC ...................................................... 709/201
See application file for complete search history.

(56) References Cited

U.S. PATENT DOCUMENTS 5,054,019 A 10/1991 Mathis et al.
5,136,291 A 8/1992 Teague
5,586,260 A 12/1996 Hu (Continued)

OTHER PUBLICATIONS

Fu, Shiwa et al., "A Practical Approach to Web-Based Internet EDI", Proceedings 19th IEEE International Conference on Distributed Computing System Workshops on May 4, 1931, Jun. 1999, 53-58.
Kay, Emily et al., "From EDI to XML—Computerworld", www.computerworld.com/softwaretopics/software/appdev/story/0,10801,45974,00, Jun. 19, 2000, 5 pages.
Kimbrough, Steven O. , "EDI, XML, and the Transparency Problem in Electronic Commerce", The University of Pennsylvania, Feb. 5, 2000, 38 pages.
Shi-Ming Huang, et al., "Developing an XML Gateway for Business-to-Business Commerce", Proceedings of the First International Conference on Web Information Systems Engineering, 2000, Jun. 2000, 67-74.

(Continued)

*Primary Examiner* — David X Yi
(74) *Attorney, Agent, or Firm* — Perkins Coie LLP (57) ABSTRACT

Information streams are integrated with context information objects and processing instruction objects. The integrated information streams are received by a solution manifold and transformed in accordance with the context information objects, the instruction objects, and logic inherent in the solution manifold. The transformed information is then viewed by a client of the solution manifold. The client may also impose different transformation rules and context information on the transformed information and return those transformation rules and context information to the solution manifold to revised the manner in which integrated data is subsequently transformed. Additionally, the solution manifold logic may be overruled by the instruction objects and/or updated by the instruction objects.

21 Claims, 6 Drawing Sheets

Related U.S. Application Data continuation-in-part of application No. 10/040,933, filed on Oct. 23, 2001, now Pat. No. 7,124,435.

(60) Provisional application No. 60/590,489, filed on Jul. 22, 2004, provisional application No. 60/484,885, filed on Jul. 3, 2003, provisional application No. 60/403,873, filed on Aug. 16, 2002, provisional application No. 60/246,821, filed on Nov. 7, 2000.

(56) References Cited

U.S. PATENT DOCUMENTS

| | | | |
|---|---|---|---|
| 5,745,908 | A | 4/1998 | Anderson et al. |
| 5,764,906 | A | 6/1998 | Edelstein et al. |
| 6,094,676 | A | 7/2000 | Gray et al. |
| 6,112,227 | A | 8/2000 | Heiner |
| 6,185,611 | B1 | 2/2001 | Waldo et al. |
| 6,195,366 | B1 | 2/2001 | Kayashima et al. |
| 6,199,102 | B1 | 3/2001 | Cobb |
| 6,301,609 | B1 | 10/2001 | Aravamudan |
| 6,393,464 | B1 | 5/2002 | Dieterman |
| 6,397,191 | B1 | 5/2002 | Notani et al. |
| 6,418,400 | B1 | 7/2002 | Webber |
| 6,519,597 | B1 | 2/2003 | Cheng et al. |
| 6,584,564 | B2 | 6/2003 | Olkin et al. |
| 6,745,388 | B1 | 6/2004 | Gupta et al. |
| 6,763,343 | B1 | 7/2004 | Brooke et al. |
| 6,772,180 | B1 | 8/2004 | Li et al. |
| 6,772,216 | B1 | 8/2004 | Ankireddipally et al. |
| 6,850,950 | B1 | 2/2005 | Clarke et al. |
| 6,871,187 | B1 | 3/2005 | Gosko |
| 6,941,148 | B2 | 9/2005 | Hansmann et al. |
| 7,089,301 | B1 | 8/2006 | Labio et al. |
| 7,124,435 | B1 | 10/2006 | Richard |
| 7,206,841 | B2 | 4/2007 | Traversat et al. |
| 7,254,709 | B1 | 8/2007 | Richard |
| 7,340,500 | B2 | 3/2008 | Traversat et al. |
| 7,386,878 | B2 | 6/2008 | Fernando et al. |
| 8,719,326 | B2 | 5/2014 | Richard |
| 2001/0056504 | A1* | 12/2001 | Kuznetsov ............ 709/310 |
| 2002/0049790 | A1 | 4/2002 | Ricker et al. |
| 2002/0083099 | A1 | 6/2002 | Knauss et al. |
| 2003/0069975 | A1 | 4/2003 | Abjanic et al. |
| 2005/0060372 | A1 | 3/2005 | DeBettencourt et al. |
| 2005/0183001 | A1 | 8/2005 | Carter et al. |
| 2005/0259776 | A1 | 11/2005 | Kinser et al. |

OTHER PUBLICATIONS

United States Patent and Trademark Office, "Advisory Action", U.S. Appl. 11/188,095, mailed May 4, 2010, 2 pages.
United States Patent and Trademark Office, "Advisory Action", U.S. Appl. No. 10/643,734, mailed Feb. 2, 2010, 7 pages.
United States Patent and Trademark Office, "Examiner's Answer", U.S. Appl. No. 11/188,095, mailed Oct. 6, 2010, 17 pages.
United States Patent and Trademark Office, "Final Office Action", U.S. Appl. No. 11/188,095, mailed Feb. 24, 2010, 11 pages.
United States Patent and Trademark Office, "Final Office Action", U.S. Appl. No. 10/643,734, mailed Nov. 16, 2009, 13 pages.
United States Patent and Trademark Office, "Final Office Action", U.S. Appl. No. 10/643,734, mailed Jun. 11, 2008, 14 pages.
United States Patent and Trademark Office, "Final Office Action", U.S. Appl. No. 10/643,734, mailed Aug. 18, 2009, 15 pages.
United States Patent and Trademark Office, "Final Office Action", U.S. Appl. No. 10/040,933, mailed May 1, 2006, 8 pages.
United States Patent and Trademark Office, "Non-Final Office Action", U.S. Appl. No. 10/643,734, mailed Sep. 27, 2007, 17 pages.
United States Patent and Trademark Office, "Non-Final Office Action", U.S. Appl. No. 10/643,734, mailed Dec. 23, 2008, 19 pages.
United States Patent and Trademark Office, "Non-Final Office Action", U.S. Appl. No. 11/188,095, mailed Jan. 22, 2009, 7 pages.
United States Patent and Trademark Office, "Non-Final Office Action", U.S. Appl. No. 10/040,933, mailed Oct. 19, 2005, 8 pages.
United States Patent and Trademark Office, "Notice of Allowance", U.S. Appl. No. 10/699,632, mailed Apr. 3, 2007, 5 pages.
United States Patent and Trademark Office, "Notice of Allowance", U.S. Appl. No. 11/188,095, mailed Dec. 24, 2013, 8 pages.
United States Patent and Trademark Office, "Notice of Allowance", U.S. Appl. No. 11/188,095, mailed Sep. 20, 2013, 8 pages.
United States Patent and Trademark Office, "Notice of Allowance", U.S. Appl. No. 10/040,933, mailed Jun. 7, 2006, 9 pages.
United States Patent and Trademark Office, "Patent Board Decision on Appeal", U.S. Appl. No. 11/188,095, mailed Sep. 12, 2013, 7 pages.
United States Patent and Trademark Office, "Restriction Requirement", U.S. Appl. No. 10/643,734, mailed Jun. 27, 2007, 6 pages.
United States Patent and Trademark Office, "Restriction Requirement", U.S. Appl. No. 11/188,095, mailed Oct. 15, 2009, 6 pages.

* cited by examiner

ADAPTIVE DATA TRANSFORMATION ENGINE

This application is a continuation of Ser. No. 11/188,095 filed Jul. 22, 2005 (now U.S. Pat. No. 8,719,326); which is a continuation in part of application Ser. No. 10/643,734 filed Aug. 18, 2003 and also claims priority under 35 U.S.C. §119 (e) from provisional application No. 60/590,489 filed Jul. 22, 2004; and said U.S. Ser. No. 10/643,734, is a continuation in part of application Ser. No. 10/040,933 filed Oct. 23, 2001 (now U.S. Pat. No. 7,124,435) and also claims priority under 35 U.S.C. §119(e) from provisional application No. 60/484,885 filed Jul. 3, 2003 and provisional application No. 60/403,873 filed Aug. 16, 2002; and said U.S. Ser. No. 10/040,933, claims priority under 35 U.S.C. §119(e) from provisional application No. 60/246,821 filed Nov. 7, 2000.

STATEMENT REGARDING FEDERALLY SPONSORED RESEARCH OR DEVELOPMENT

This invention was made with Government support under contract DASG60-02-P-0233 awarded by the U.S. Army Space and Missile Defense Command. The Government has certain rights in the invention.

Each of the applications listed above is hereby incorporated by reference in its entirety.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office, but otherwise reserves all copyright rights.

COMPUTER PROGRAM LISTING APPENDIX

Two Computer Program Listing Appendices have been submitted in this application on a compact disc and the material on the compact disc is hereby incorporated-by-reference in its entirety. The total number of compact discs (including duplicates) and the files on each compact disc is specified below:

Compact Disc 1: Copy 1:
Computer Prgm Lstng Appx 1.txt; 21 KB; Created: 10/12/2015 04:13:16 PM
Computer Prgm Lstng Appx 2.txt; 6 KB; Created: 10/12/2015 04:13:16 PM
Compact Disc 2: Copy 2 (duplicate):
Computer Prgm Lstng Appx 1.txt; 21 KB; Created: 10/12/2015 04:13:16 PM
Computer Prgm Lstng Appx 2.txt; 6 KB; Created: 10/12/2015 04:13:16 PM

BACKGROUND

In complex systems, many kinds of data are relied upon to obtain results. Integrating and making sense of these disparate kinds of data is a challenging task. For example, in the context of Battle Management Command Control and Communications ($BMC^3$) systems, position and identification of friendly, neutral, and enemy actors needs to be determined quickly based on a wide variety of possible data types. Data types to be utilized include infrared (IR), microwave, radar, electronic intelligence, human intelligence, unmanned aerial vehicle (UAV), network monitoring, application management, and procurement systems to name a few.

Systems have been developed to tackle these complex tasks. However, the software developed typically falls in one of 2 categories: Hard coded for scalability and performance, or data driven. Hard coded solutions cannot be reconfigured without development of a new release by programmers. On the other hand, data driven approaches quickly go out of control as the number of rules grows and exceptions become the rule. In both cases, the problem is that these systems are not adaptive—they utilize an architecture that is either predetermined or cumulative. In neither case is the architecture adaptive to changes in environment.

The typical architectures also break down information into data, losing critical context information in the process. Data driven solutions attempt to resolve this problem by storing business rules and other context information, but in systems where exceptions are the rule this approach can quickly get out of control.

Another problem is that such systems as have been deployed do not provide for real time solutions—the decision makers are made to wait for the information while the system slowly prepares it for presentation. In certain fast moving situations (e.g., battle, air traffic control), timeliness of the information is important to minimize risk of human life.

While technology evolves new ways of generating data, it takes a very long time to integrate these new data generating means into current decision system architectures. That is because the system must be re-programmed to accept something new or new rules must be developed following preordained rule semantics from a type of sensor (or source of data) that was not envisioned when the most recent release of the system was made.

Thus, what is needed is a way to integrate and make sense of disparate kinds of information in a way that is adaptive to operational needs, provides real time solutions, and is adaptive to incorporating information received from newly developed technology.

SUMMARY

In an embodiment of the present invention, a solution manifold comprises a transformation environment containing in which information items (objects) that carry their own data and in which instruction objects comprise unique code to interpret the object data. Information objects are organized according to relationships defined by each item and transformed by rules and code unique to the solution manifold (herein, a "transformation"). Thus, the solution manifold represents a set of related information agents operating in a context that modified their behavior based on user and environment requirements.

The solution manifold receives information objects from an integration layer. The integration layer acquires data from diverse sources, integrates context information objects and instruction objects with the data in the form of Meta data, and formats the integrated data in a way that it is readable by the solution manifold. According to an embodiment of the present invention, a "wrapper" is applied to the integrated information that is readable by the solution manifold. The solution manifold then transforms the integrated data based on the rules established for the solution manifold, the context information objects, and the instruction objects to produce transformed information that may be viewed by a user. The system of the present invention executes universally regardless of the platform it is being run on. The system is platform agnostic in that the code that is "in-lined" with the streaming data (instruction objects) comprises its own portable executables or inline stream processing instructions.

Nodes comprising the solution manifold perform analysis operations on the transformed information. The analysis operation may be customized by a node receiving the data automatically selected by the node based on the transformed information. Analysis is adaptive and evolutionary, constantly looking for improved analysis operations or solution patterns and not simply relying on feedback from a client.

Additionally, the operating system is dynamically emitted to the data processing unit based on the intersection of privileges and rights specific to the content and its consumer. A consumer may be an individual, another application or virtual machine. The operating system that is dynamically emitted is encoded within the streaming data.

One aspect of the present invention is a solution manifold that integrates and interprets disparate kinds of data and analysis operations.

Another aspect of the present invention is a solution manifold that is adaptive to operational needs.

Another aspect of the present invention is a solution manifold that provides real time solutions.

Another aspect of the present invention is a solution manifold that can dynamically enrich real time data streams such that the data transformations can be reevaluated and altered after the time of acquisition.

Still another aspect of the present invention is a solution manifold that is adaptive to incorporating data received from newly developed technology.

Yet another aspect of the present invention provides for the incorporation of multiple solution manifolds operating in a collaborative network over time and space wherein the raw data which is encoded as originally acquired can be reevaluated at times in the future for example with novel nodes added to the solution manifold after the data has been acquired. The reevaluation of raw data is possible because the raw data is not altered before, during, or after analysis but instead the data manipulations accompany the raw data. Other analysis solution can be applied to the raw data thereby generating a new generation of transformed information. A new solution can be applied to the raw data resulting in newly emitted transformed information generated at some time in the future with solutions that were not yet created at the time that the raw data was originally acquired.

Yet another aspect of the present invention provides for a solution manifold that associates the raw data with the analysis inventions encoded therewith.

Yet another aspect of the present invention provides for a solution manifold that tracks the analysis inventions that have previously been applied to the raw data and stored as independent data points.

Another aspect of the present invention provides for an inventory of solution operations wherein the inventory will evolve over time and use thereby providing the solution manifold with nodes that support emergent behavior.

One aspect of the present invention provides adapted markup language for expressing programmatic manipulations of the streaming data directly in the data stream thereby reducing the need to deploy software upgrades in the field and facilitating highly distributed processing of data and heterogeneous platform support with relatively minimal overhead.

One aspect of the present invention provides for an evolving, self-maintaining, intelligent data-integration and transformation system, representing and distributing the combined and increasing knowledge and techniques of all its users and systems.

Yet another aspect of the present invention provides for strong object ownership.

One aspect of the present invention provides a novel platform agnostic means to represent portable code.

Another aspect of the present invention provides for encoding portable executable code into the streaming data.

Another aspect of the present invention provides for an improved programming language for encoding into a real time stream of data information regarding the object data structure.

Another aspect of the present invention provides for transaction-based communication.

Yet another aspect of the present invention provides for smart object routing.

Another aspect of the present invention provides a means for modifying content in streaming data dynamically.

Another aspect of the present invention provides a means for introducing a timeline context to streaming data.

Yet another aspect of the present invention provides for server independence.

Still another aspect of the present invention provides for scalable process management.

One aspect of the present invention provides for supporting polymorphic constructs from a wide variety of source languages.

DETAILED DESCRIPTION

Figure 1:
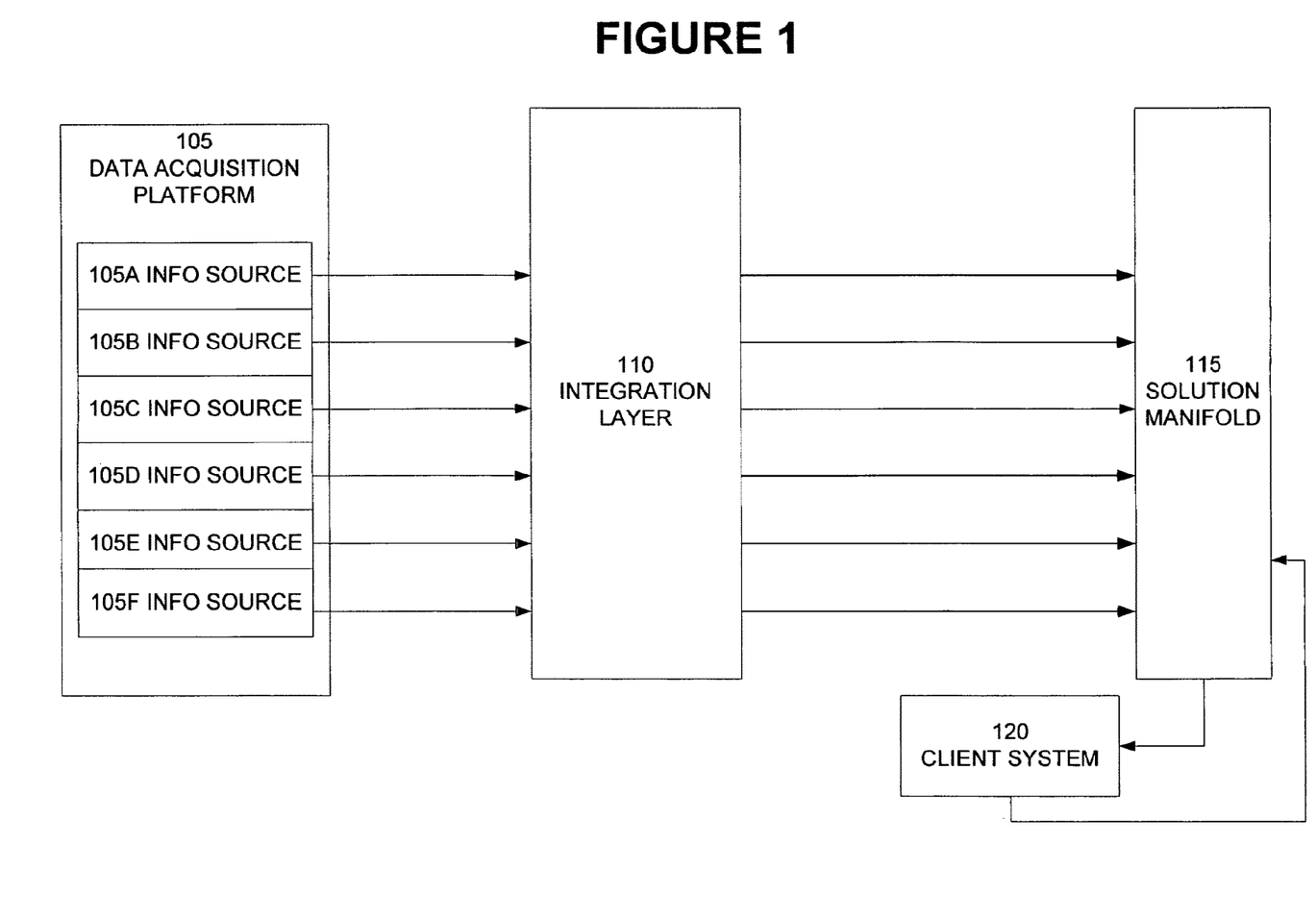
FIG. 1 illustrates an architecture in which a solution manifold according to an embodiment of the present invention is illustrated.

Referring now to FIG. 1, an architecture in which a solution manifold according to an embodiment of the present invention is illustrated. Referring to FIG. 1, solution manifold 120 receives information from data acquisition platform 105 via integration layer 110. As illustrated, data acquisition platform 105 comprises information sources 105A-105F. By way of illustration, information sources 105A-F may comprise stock information, weather information, and military sensor information. However this is not meant as a limitation. As will be appreciated by those skilled in the art, other data sources may be used with components of the present invention without departing from its scope.

Integration layer 110 performs an initial transformation of data. For example, data from disparate sources are transformed by the integration layer into a system preferred format. Further, integration layer 110 may record inherent relationships between the different data sources and/or acquisition parameters such as time, temperature, power failures, user privileges and acquisition settings during the time of acquisition of data. The data points are integrated by integration layer 110 with the raw streaming data as one or more meta tags to produce integrated information.

Integration layer 110 defines how often the meta tags will be repeated within the stream. An integration layer may encode Δ headers within the stream of raw data wherein a Δ header comprises information as to the frequency with which full headers appear in the streaming data. A data processing unit (DPU) within solution manifold 115 seeking to read the streaming data will begin reading the data from the next meta tag or full header found within the stream if the DPU carries the appropriate privileges to do so. Further data processing access further depends upon the privileges defined by integration layer 110 and whether the data processing unit meets the minimum requirements of the privileges established for a particular information source.

In addition, the object data structure may contain the information regarding the coding segment, libraries required by the data processing unit for processing the data and privileges necessary to read the data. (See, FIG. 3.)

Integration layer 110 further functions to interpret inputs from different data channels and sources. Integration of the data provides a plurality of modalities by which the system interacts with the data. The data is thus made accessible for use by a complex system.

While FIG. 1 illustrates integration layer 110 as a discrete logical entity, integration layer 110 may be embedded within a data acquisition system or operate separately therefrom. A data acquisition system can communicate with an integration layer physically, remotely or some combination thereof. In addition, while integration layer 110 and solution manifold 115 are illustrated as having a one-to-one relationship, the invention is not so limited. An integration layer may serve multiple solution manifolds. Additionally, a solution manifold may receive integrated information from more than one integration layer.

In another embodiment the integration layer transforms the data into a platform agnostic language such as XSML with base 85 encoding.

For example, data acquisition platform 105 may comprise a flow cytometer that can read biological samples from the field. Acquisition parameters such as fluorescence wavelengths at different channels, forward scattering of particles, side scattering of particles and flow rate are recorded within the streaming data as it is acquired. Information from a water bath wherein flow cytometry samples are incubated prior to analysis is sent to integration layer 110 to be integrated with the acquisition parameters and raw streaming data as it is acquired. Additionally, the time course over which the samples are analyzed, as well as operator information is sent to the integration layer 110 where the information is integrated with the acquisition parameters and raw streaming data.

A solution manifold 115 is provided between the integration layer 110 and a client system 120. A client system is a device or system that can process data from diverse sources. For example, a client may be a securities analysis system, an air traffic control station, or a $BMC^3$. Feedback is provided from the client system 120 back to solution manifold 115. The feedback is the basis of software adaptation of solution manifold 115.

Figure 2:
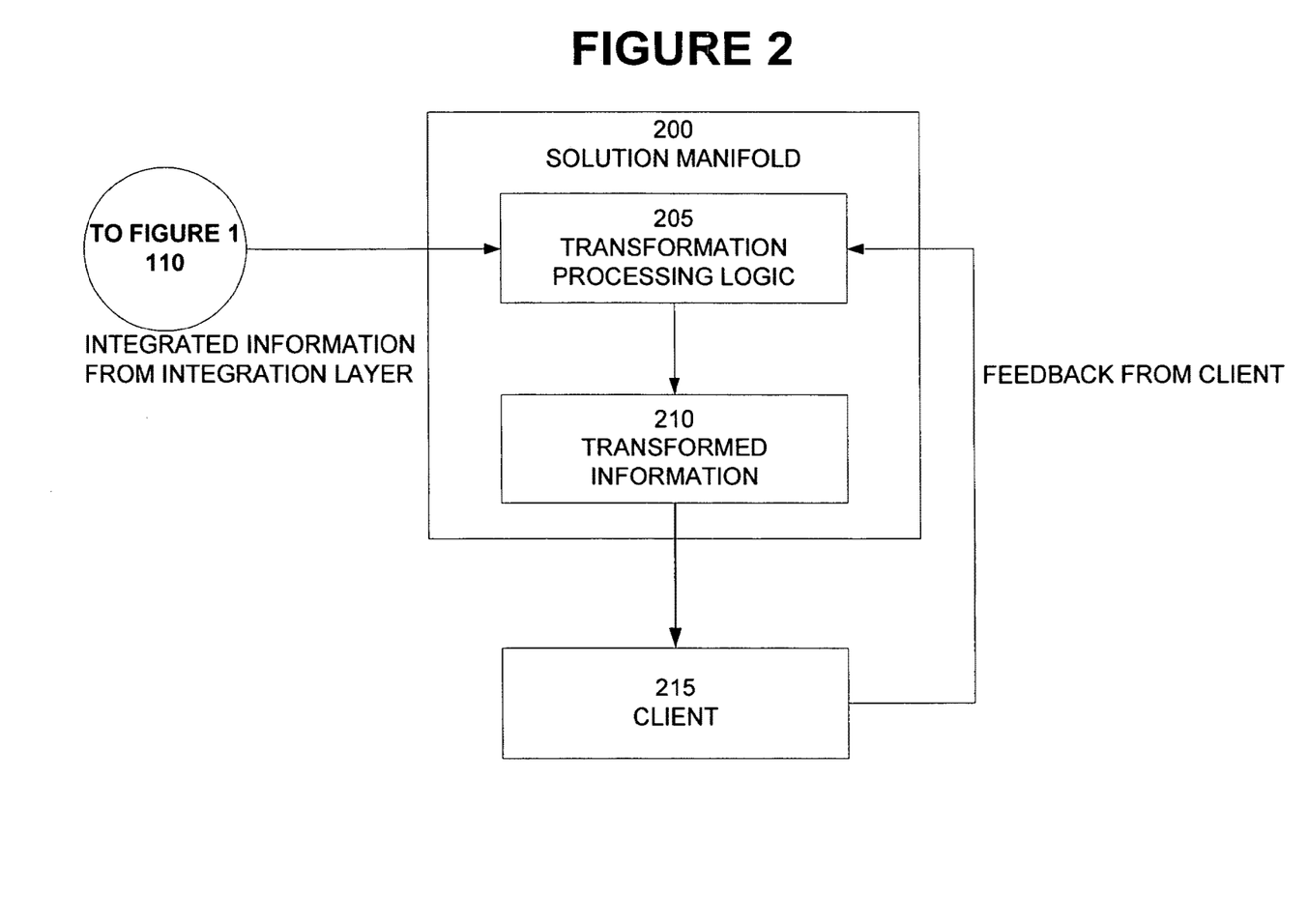
FIG. 2 illustrates a solution manifold according to an embodiment of the present invention.

Referring to FIG. 2, a solution manifold according to an embodiment of the present invention is illustrated. Referring to FIG. 2, a solution manifold 200 provides for real time processing of the incoming disparate data provided by integration layer 110 (see, FIG. 1). Transformation processing logic 205 is applied to the incoming integrated information (data and attached metadata tag(s) or object data structure(s)) as provided by the integration layer (FIG. 1, 110) to produce transformed information 210. Transformed information 210 represents a "view" of the raw data that depends on the combination of analysis operations contained within the object data structure of transformation processing logic 205. Additionally, the transformed information may be a summation of previous analysis operations applied to the integrated information, or a novel analysis operation created either manually or automatically that is separate and distinct from the analysis operations performed on the integrated information during routing. The transformed information utilizes a universal format.

According to an embodiment of the present invention, a chain of custody fingerprint is further carried within the object data structure to aid in identifying from where the analysis operations derive.

The solution manifold 200 is evolutionary in that it constantly revises its own solution algorithms (analysis operations) based on the feedback it receives from the client system 215. In addition to use of feedback, the solution manifold 200 also continually experiments with the use of alternative algorithm patterns (also know as analysis inventions or solution operations) in a search for improved solutions. Thus, the evolution is not simply reactive. Rather, it proactively seeks more effective solutions.

One result of the evolutionary nature of the solution manifold is that the solution manifold produces active code which is implemented "on the fly" as part of a solution algorithm. That gives the solution manifold 200 the ability to actually re-program itself. This is accomplished by enabling the system to emit code in the form of custom adapters that can read new and different protocols. In an embodiment of the present invention, a transform code (used to directly transform the incoming data) is developed by the code of the solution manifold 200 and incorporated into the transformation processing logic 205.

According to an embodiment of the present invention, a transformation is performed by computing nodes (also referred to herein as data processing units or DPUs) that may be arranged in various topologies. As will be appreciated by those skilled in the art, the data processing units are not limited to one physical device.

The system of the present invention executes universally regardless of the platform on which it is being run. The system is platform-agnostic in that the code that is in-lined with the streaming data comprises its own portable executables or inline stream processing instructions (collectively, instruction objects).

According to one embodiment of the present invention, the programming language is a XSML. XSML transformation code is an adaptation of eXtensible Markup Language (XML) standard. The adaptation uses and extends existing computing language and protocols.

For example, extensible Stream Markup Language (XSML) is a stream oriented markup language designed for the manipulation and markup of streams. A transformation code written in XSML is incorporated in-line or on a parallel track into the live data stream. The transformation code provides the processing instructions for transforming the raw data (with the information objects) into transformed information while preserving the raw data for future transformations with different transformation codes.

XSML overcomes the limitations of XML data without the overhead and limitations usually associated with XML documents. For examples, a typical data segment in XSML has as little as 25% overhead compared to its raw binary representation. The same data converted to an XML format could expand to over 1000% or more overhead and would still be ill-suited for dealing with a real-time stream of data that does not have a well defined start or end point. For example, XSML text encoding incurs only about 25% increase in size over the binary form and the content can be manipulated directly in the text form without requiring that the entire content be converted back to binary. XSML encoding allows meta-tags to be embedded or in-line with the data without changing the raw data.

For example, a purchase order form requires a correction to the order number line. To correct the line with XML and base 64 encoding the following steps are required. First the text of the purchase order would have to be decoded back to XML. Second the XML text would have to be parsed. Third, the order number node would have to be identified and corrected. Fourth, the corrected XML text would be written back to the string. Finally, the XML text would be encoded back to base 64 code. In contrast, a purchase order written in XSML, does not require conversion to binary since content can be manipulated directly in the text form of XSML which is encoded by Base 85.

Base 85 encoding provides a resulting string that looks a lot like a random ASCII string and is hostile to being parsed by conventional expression parsers utilized in information networks. Conventional parsers see much of the base 85 encoded string as escape codes and will refrain from even attempting to make sense of it. This increases security because the true nature of the string will be appreciated best by servers that have been upgraded to interpret them properly.

Base 85 encoding also provides the useful aspect of permitting discrete blocks of the encoded data to be quickly decoded separately from the rest of the base 85 encoded data. That is because every five character block in base 85 maps directly to a 32 bit double word (i.e., four bytes) of base 2 (binary). This is both more secure and more efficient.

For example, streaming data may have a security header at the beginning of the data stream. The security header is further composed of a first header $H_1$ and a second header $H_2$. $H_1$ comprises information concerning the cryptographic traits of the security header so that a mail handler can determine if it is even capable of adequately handling the security header. The second header $H_2$ comprises license information so that it can be determined whether the expiration date for the security header is past and what the consequences of such a contingency are. Thus, with a minimum of processing effort and no compromise of security, basic housekeeping issues can be casually determined by automated systems encountering the security header. By way of illustration and not as a limitation, a Managed Information Conversation Agreement (MICA) can be used for this purpose. For more information regarding MICA, see "Managed Information Transmission Of Electronic Items In A Network Environment," application Ser. No. 10/643,734 filed Aug. 18, 2003 and incorporated herein by reference in its entirety for all purposes. An example of portable code for one MICA class is illustrated in Table I according to one embodiment of the present invention.

Because base 85 encodes 5 characters for every 32 bit double word, modifications to an encoded document are facilitated. For example, a purchase order requiring a correction at the order number node is corrected by identifying the node and rewriting the node in place as desired using base 85. XML and base 64 encoding requires more steps to accomplish the same goal. An example of base 85 character set is illustrated in Table II according to one embodiment of the present invention.

XSML brings the benefits of XML to streams and other continuous data sources while minimizing the overhead involved. Further while XML can describe a multitude of documents, the program resides apart from the data itself. In contrast, XSML overcomes this limitation by providing a means for the data and the executable program to reside together according to one embodiment of the present invention.

In one embodiment of the present invention, raw data, associated transformations, correlations, differencing, security permissions, routing history and other manipulations are incorporated in the same universal XSML format, thus ensuring that no underlying information is lost and that all transformations can be revised and even undone as needed. Transformations encoded with XSML are embedded in-line or in a parallel channel alongside the data. Embedding the transformation code innocuously alongside the data, allows the raw data to remain unaltered while conveying to downstream users the processing steps required to visual the data in a virtual transformed state according to any one or more data analysis operations.

In one embodiment of the present invention, XSML can be represented in either a text compatible format or in a native binary form. One example of the text available format utilizes an 85 or 88 bits encoding scheme. The 88 bit encoding scheme may be used for error correction purposes. These encoding schemes are both based on the representation of four (4) bytes as five base 85 (or 88) characters. However both forms can be exchanged between any computing platforms and it is possible to go from one to the other as desired.

For example, XSML uses character groups that have encoding values above 0xFFFF. For example, using values above 0xFFFF makes it very easy for the DPU to recognize tags from data. For example a typical stream encoded XSML might contain data like this (spaces are added for readability):
. . . aBcDe 12345 FgHiJ . . . with each group of five characters representing 32 bits of data. If this example represents a specific measurement, a tag identifying the nature of the data could be added as follows: . . . ZZZb aBcDe 12345 FgHiJ ZZZa . . . .

In this example ZZZa represents the start element and ZZZb the closing element. The exact interpretation of the tags is assumed to have been defined earlier in a key frame. Key frames define the context for all subsequent tags until another key Frame comes along to replace or append it. A key frame that defines a complete starting context with no dependencies is known as a Master Frame. All manipulations of the stream must start at a Master Frame or object data structure.

In another embodiment, tags are attached to raw data by directly overloading the actual data groups.

Inline Stream Processing Instructions (ISPI) provides for processing of information that blends functional programming languages and stream based information processing to embed rich adaptive transformations in XSML streams. According to one embodiment of the present invention, XSML streams are processed by computing nodes described herein as Data Processing Units (DPUs) within the solution manifold. The ISPI or code segments are found in the object data structure that is embedded in-line or in parallel with the data stream.

Figure 3:
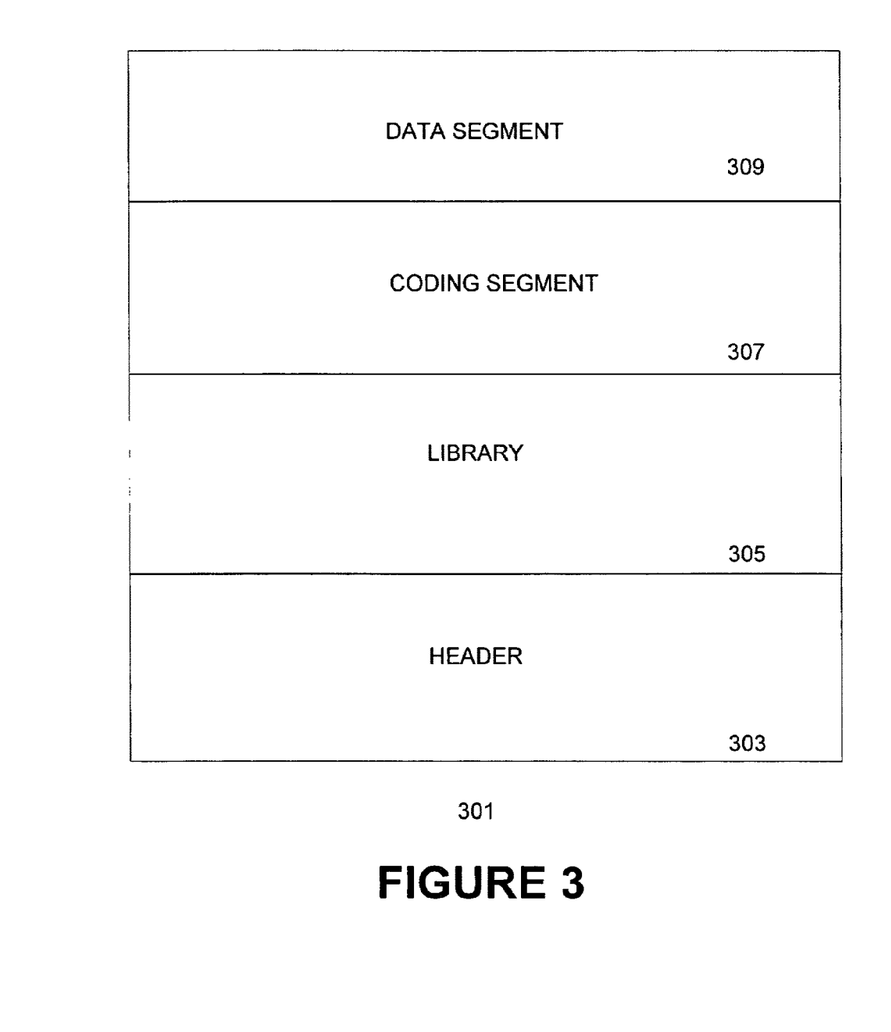
FIG. 3 illustrates an example of an object data structure that would be in-lined with the raw data according to an embodiment of the present invention.

Referring now to FIG. 3, an example of a high level object data structure is illustrated according to an embodiment of the present invention. Referring to FIG. 3, object data structure 301 comprises several segments that form an executable stack.

A header segment 303 could be a stub header that points the user to the real header or a full header. A full header comprises information regarding the version, routing of the information and preliminary information regarding security permissions required to open the data further. According to one embodiment of the present invention, a parser (not illustrated) tokenizes a header by reading the first 5 characters to identify the version. Since a conventional parser sees base 85 code as escape codes the conventional parser will refrain from even attempting to make sense of it. This increases security because the true nature of the string will be appreciated best by servers that have been upgraded to interpret them properly.

A library segment 305 comprises information regarding the number of libraries required to process the data, the length of the code segment and security permissions required to execute the code segment. Library segment 305 may further comprise information regarding assembly of the necessary programmable executables required by the data.

According to one embodiment of the present invention, library segment comprises a 32 bit flag that provides information about the data that is associated with the object data structure. For example the 32 bit flag may contain information as to whether the data can be downloaded by the receiver and the length of the text. Further when the sender sends the data to designated recipients, the sender may know a priori that the recipient has the required program for viewing the data and the library segment within the object data structure will only reflect information as to the appropriate program to execute to view the data. More specifically, if a graphic representation is necessary to view the data and the sender is only sending the data to recipients who already have the graphical representation capability in the library of a data processing unit, the sender would not bloat the object data structure library segment 305 with the program but instead provide information within the object data structure library segment as to which graphical representation program should be executed by the recipient to view the data. In contrast if the program is not known to exist within the recipient's DPU library, the object data structure library segment 305 may contain either a self executing program or download instructions for obtaining the same. Further, everything after this 32 bit flag is self describing.

A code segment 307 comprises intermediate code to interpret compiled code of a data segment. The code segment may be encrypted. If the data segment is encrypted, a user would need to provide a valid key to access data. A header may be added to the code segment that identifies the level of compilation for the code segment thereby providing further security attributes. Once a DPU loads a code segment, a code segment is converted into binary and allows the handler with appropriate permissions to visualize a virtual transformed data segment.

A data segment 309 comprises real time streaming data with a solution operation embedded in-line with the data or in a parallel channel. A data segment may have multiple parts therein but the portable executable format would be blind to this.

Figure 4:
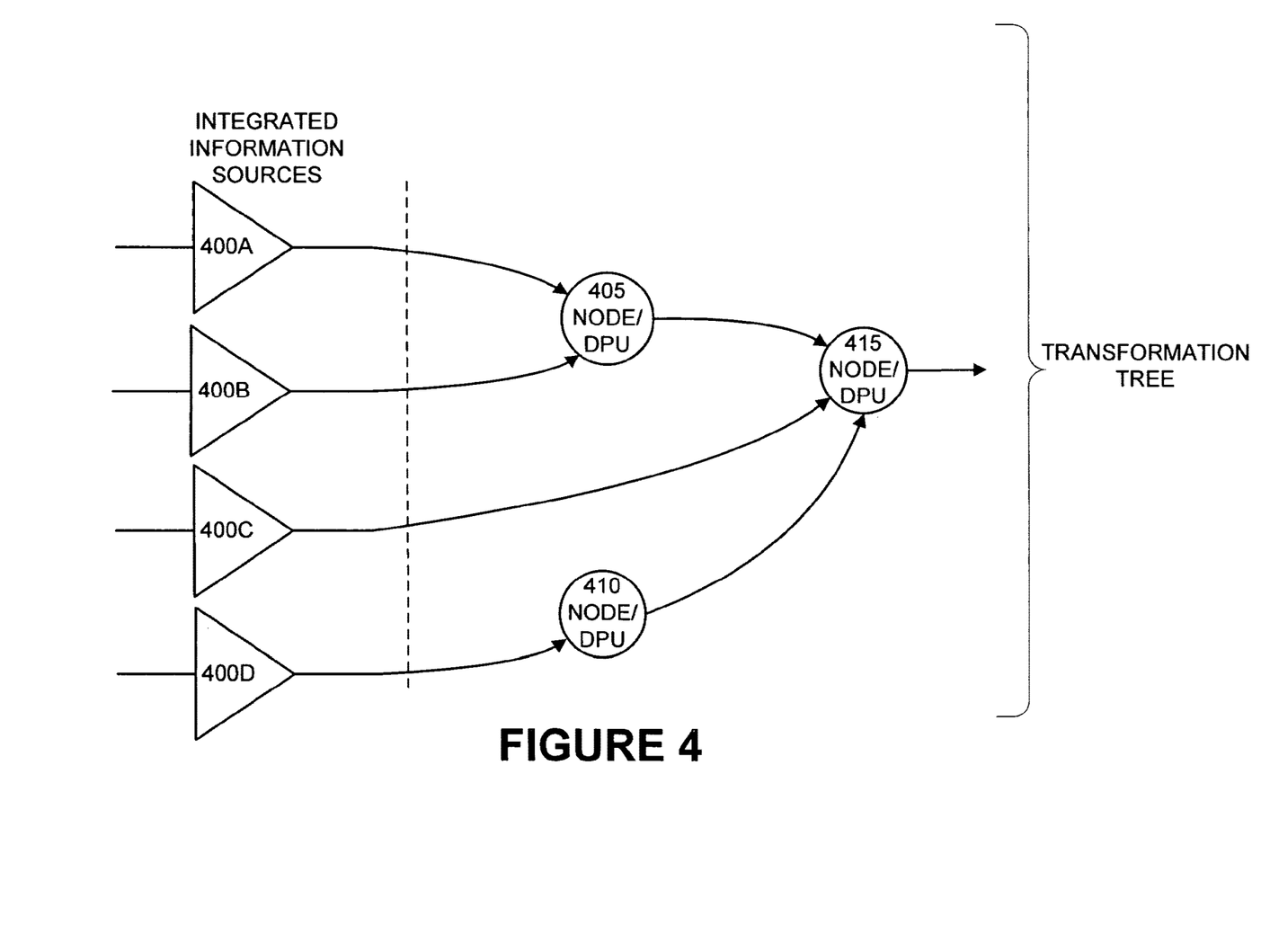
FIG. 4 illustrates an example of a data transformation tree implemented by a solution manifold according to an embodiment of the present invention.

Referring to FIG. 4, an example of a data transformation tree implemented by a solution manifold according to an embodiment of the present invention is illustrated. Solution manifold utilizes any number of topologies for a given data transformation. In this example, a tree topology is shown. The tree topology may act as a summation of the analysis operations performed on the streaming data that are useful in the view of a node.

From the left side of the illustration, integrated information is received from discrete integration layer sources 400A-D and are combined and transformed via the various transformation nodes (405, 410, and 415) in the tree network. The data transformation tree 400 does not store any of the raw data received. Rather, it stores only the transformations as they are generated. This provides for a run time interface. The interface has no need to store the raw data once it has been implemented into the solution algorithm, since the raw data has been incorporated in the transformed information that has been created.

According to an embodiment of the present invention, the data transformation tree 400 is programmed to recognize questions of first impression, types of data and constellations of data that have never been synthesized by the solution manifold 400. This places the solution manifold 400 on notice that it will need to adapt at an enhanced rate to quickly develop a new aspect of its solution matrix (be that topology tree, mesh, etc.) to handle the challenge of a new set of facts.

The solution manifold 400 does not, however, simply focus on a specific confluence of facts. The process it implements is aimed at capturing an intent that those facts represent.

Thus, node of the transformation tree is not burdened with analysis of all of the incoming data. Rather, transformed information that is streamed into computing nodes/DPUs (405, 410, and 415) is subject to analysis tools as it arrives at the various nodes (405, 410, and 415). A computing node/DPU identifies a header of an object data structure and can read the quantum of streaming data that follows the header using the solution operation that is carried by the coding segment of the object data structure, create its own solutions operation or carry out the manual instructions provided by the user. The transformed information has integrated with it metadata about the sensors that originally produced the data on which the transformed information was based.

According to an embodiment of the present invention, the solution manifold captures corrections (failure mode information) generated automatically and manually, thereby learning from mistakes but never taking over the actual decision process. A baseline level of competence is derived from incorporating known data-integration and analysis tools, and then grows in utility every time it is used Embodiments of the present invention have applicability in a number of different fields of technology. It is useful for air traffic control systems to more quickly and accurately present information to controller personnel. It is useful to model biological systems. It is useful for a weapons platform to identify when to shoot and when not to shoot and in health care contexts for rabidly emerging bioterrorism threats.

In most implementations, knowledge of geographic coordinates is important to producing useful analysis. In particular, the solution manifold identifies zones of influence for transformed information from a particular information source.

According to one embodiment of the present invention, the system incorporates user defined solutions as the user manipulates a plethora of information available thereby creating novel solutions or analytic "inventions". The code representing these data-analysis inventions are stored in nodes of the solution manifold.

Each new analytic 'invention' is incorporated directly in the stream and stored in a node of a solution manifold for use by any and all future users (if desired and permitted). Therefore, over time (first via field-testing, and then deployment), the system and method of the present invention evolves to provide increasingly sophisticated and useful streams of 'intelligent' data. A dynamic menu representing the useful data integrations, fusions or representations (data-analysis "inventions") are presented for automatic or manual selection and are then embedded in the data stream being processed. If the desired manipulation does not exist, a novel data-analysis invention will be created either manually or automatically and added to the solution manifold.

Computing nodes/DPUs can interpret data streams and render data streams, add new meta-information "transformation code" to the stream. Computing nodes/DPUs can also evolve based on the patterns found in the streams they process.

Data fusion, integration and association connections are stored in a solution manifold, composed of a multi-dimensional mesh of interconnected nodes or DPUs. Each DPU represents an object corresponding to the data-analysis operations (sometimes referred to as "inventions" of a user, solution operations, algorithms or data points). A data analysis invention is a process applied to the data to transform the raw data. Virtual transformed data can be further processed with additional data analysis inventions to yield further transformations to virtual transformed data.

The mesh of interconnected DPUs is constantly being updated, pruned, and elaborated, in response to user requests and error-correction edits, and inclusion of novel analysis invention as they are dynamically created in both real-time and in background processing.

In one embodiment of the present invention, the solution manifold is equipped with a multi-language execution environment. A Common Language Runtime (CLR) engine is an example of a multi language execution environment.

In another embodiment, CLR is extended to provide support for parametric polymorphism (also known as generic) programming language.

For example, a DPU is extended with a LINUX based implementation of the CLR. A custom LINUX kernel is integrated and extended using a technique developed by Microsoft Research to provide native support for generics in the CLR. The CLR provides a shared type system, intermediate language and dynamic execution environment for the implementation and inter-operation of multiple source languages.

For example, a DPU is operated with the open source version of Microsoft's .NET Common Language Infrastructure (the Mono Project) as an example of Common Language Runtime (CLR) implementation. The DPU executing a custom Linux kernel implementation of CLR supporting parametric polymorphism programming language (also know as Generics) provides access to XSML streams in a polymorphic manner with maximum performance, integrity and security.

Extending the CLR with direct support for parametric polymorphism provides a very expressive environment supporting parameterized types, polymorphic static, instance and virtual methods, "F-bounded" type parameters, instantiation at pointer and value types, polymorphic recursion, and exact run-time types. The implementation takes advantage of the dynamic nature of the runtime, performing just-in time type specialization, representation-based code sharing and novel techniques for efficient creation and use of run-time types.

For example, the .NET Common Language Runtime consists of a typed, stackbased intermediate language (IL), an Execution Engine (EE) which executes IL and provides a variety of runtime services (storage management, debugging, profiling, security, etc.), and a set of shared libraries (.NET Frameworks). The CLR has been successfully targeted by a variety of source languages, including C#, Visual Basic, C++, Eiffel, Cobol, Standard ML, Mercury, Scheme and Haskell.

The primary focus of the CLR is object-oriented languages, and this is reflected in the type system, the core of which is the definition of classes in a single-inheritance hierarchy together with Java style interfaces.

Also supported are a collection of primitive types, arrays of specified dimension, structs (structured data that is not boxed, i.e. stored in-line), and safe pointer types for implementing call-by-reference and other indirection-based tricks. Memory safety enforced by types is an important part of the security model of the CLR, and a specified subset of the type system and of IL programs can be guaranteed type safe by verification rules that are implemented in the runtime. However, in order to support unsafe languages like C++, the instruction set has a well-defined interpretation independent of static checking, and certain types (C style pointers) and operations (block copy) are never verifiable.

IL is not intended to be interpreted; instead, a variety of native code compilation strategies are supported. Frequently-used libraries such as the base class library and GUI frameworks are precompiled to native code in order to reduce start-up times. User code is typically loaded and compiled on demand by the runtime.

The role of the type system in the CLR provides runtime support and facilitates language integration, i.e. the treatment of certain constructs in compatible ways by different programming languages. Interoperability gives a strong motivation for implementing objects, classes, interfaces and calling conventions in compatible ways. Adding parameterized types to the CLR facilitates encoding of many language features not currently supported as primitives. For example, n-ary product types can be supported simply by defining a series of parameterized types Prod2, Prod3, etc.

In another embodiment of the present invention, dynamic loading and code generation is enabled through the use of XSML. This aspect provides for "Just-in-time" type specialization. For example, instantiations of parameterized classes are loaded dynamically and the code for their methods is generated on demand. For example, where possible, compiled code and data representations are shared between different instantiations.

In one embodiment of the present invention, CLR implementation of loading and compilation is performed on demand. A user may implement mix-and-match specialization and sharing. This embodiment allows for efficient support of run-time types. For example, the implementation makes use of a number of novel techniques to provide operations on run-time types that are efficient in the presence of code sharing and with minimal overhead for programs that make no use of them.

According to another embodiment of the present invention, a programmatic sub-system provides a balance of strong data types (a radar sensor reading vs. a thermal sensor reading, for instance) with the ability to create code that can act polymorphically against data types that are only known at runtime (for instance the ability to have libraries that can deal with radars in a generic sense without the typical overhead of runtime discovery).

Another embodiment of the present invention employs a secure, identity-based, context-aware framework to manage and distribute solution manifolds and their associated data sources. Using active real-time code generation techniques the system provides the robust, low-maintenance, flexible architecture that long-term embedded systems require. Data, for example, a data file, a packet of video data, a message, or a system command, is considered a data object and is transmitted. Each object transmitted has its own embedded security policy and digital signature.

Figure 5:
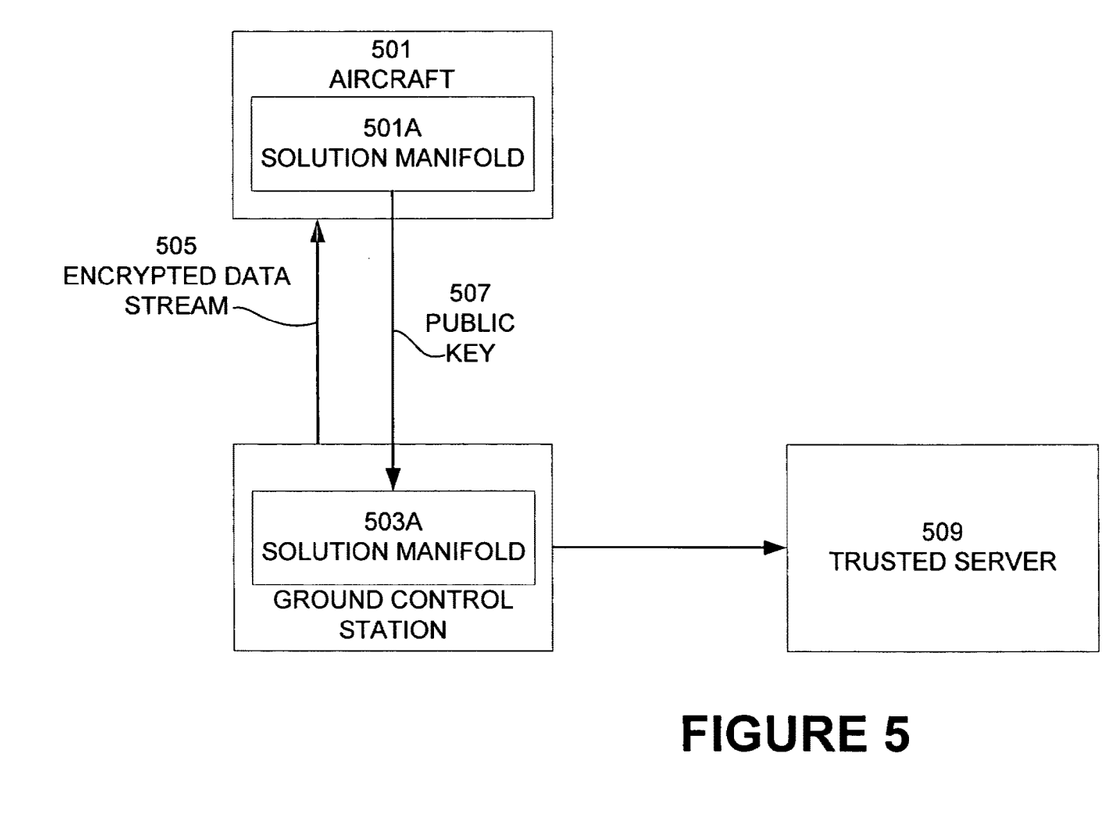
FIG. 5 illustrates an example of content based security for smart object structures within the signal according to an embodiment of the present invention.

Referring now to FIG. 5, an example of data exchange based on security permissions is illustrated according to one embodiment of the present invention. An aircraft 501 comprising a solution manifold 501A in route flies over a ground control center 503 comprising a solution manifold 503A and receives a stream of data 505 that is encrypted. The data has one or more meta tags associated therewith. The meta tag may include a partial header which comprises a public key identifier for ground control center, however before the aircraft 501 is able to read the rest of the signal a valid public key from the aircraft must be exchanged with ground control center 503. The aircraft's solution manifold 501A determines the need for a key exchange with ground control center 503 from the Meta data. The aircraft's solution manifold 501A certifies that the public key embedded within the header of the transmitted data was issued by an asset belonging to a common custodian and then creates and issues a key pair (public/private) for subsequent transmission to ground control. The plane's transponders transmit the plane's public key 507 to ground control center 503. An SSL session is then created. Upon receipt of the plane's public key, a solution manifold 503A within ground control center 503 certifies via trusted server 509 that the public key received from the plane's transponder is issued by an asset belonging to a common custodian. After the two way public key exchange is completed, ground control center 503 encrypts the rest of the signal with the plane's public key and permission is granted for the aircraft to receive information within the signal that is commensurate in scope with the security permissions held by the plane. The permissions may be valid for any interval of time from seconds or hours to months or for an indefinite period of time.

According to another embodiment of the present invention, a portion of the certification occurs within the plane's transponder where a transportation authority digital signature resides and verification capability for verifying signatures from other assets belonging to a common custodian. The electronic signature is coupled to the public key issued by the transponder and sent to ground control center 503. The signature is verified by a certification authority. A certification authority may be a trusted server 509. Ground control center's electronic signature is attached to the public key ground control sends to the plane. The plane's transponder verifies that the signature is from an asset belonging to a common custodian. The identities of both parties remain anonymous to each other and to third parties.

It is important to note that XSML streams are a special case of objects that have some unique polymorphic capabilities. Additionally, XSML streams present the notion of strong ownership consistent with several embodiment of the present invention. Strong ownership means that only an object's creator can determine or change the security policies associated with that object (access, modification, expiration, etc.). Each data object is encrypted and digitally signed at creation and the owner determines who, if anyone, can present credentials to obtain access to the object. Credentials and signatures are validated before any transaction can occur. An additional benefit is derived from the fact that an object's security policies are directly associated with the object (instead of being obtained from a global configuration file, for example). Direct association means an object's security policies can be changed on the fly without affecting any other aspect of the system.

In another embodiment a basis for determining and verifying identity is established. An identity can represent an individual, an organization, or a role. For instance, a doctor might have an identity as a board-certified physician as well as a personal identity. Identities are managed and assigned to a physical person or organization by the owner of the environment for which the identities are created (or another authority to which this role has been delegated). Environments can be specific to DPU's or categories of nodes within a solution manifold.

Information can be loosely defined as data in context. The implication is that the meaning of any piece of data and what can be done with it depends on the context. Here we define context as including one or more of the following attributes: such as where it is used, who is using it, the data's chain of custody, programs required to access and or manipulate the data and what it is being used for.

For example, a patient's X-ray records should only be accessible to the billing department in terms of what they cost, but your doctor would need access to the actual image (although he may or may not require access to the costs associated with the procedure). In a scenario like this, when the doctor sends the X-rays to the billing department only the elements required for billing should be accessible. Conversely, if the billing department sends the X-rays back to the doctor, the X-ray images should be accessible once again. The nature of the information has not changed, the context has. Information may be further defined as the communication or reception of knowledge or intelligence. This clearly implies that information has a value and is intended for a specific target audience. Management of Information is the concept of explicitly embedding the intelligence required to allow information to transform itself based on the identity of the user consuming the information, the context in which is being used, and any other criteria that may be appropriate.

A flexible means of distribution is another aspect of the system of the present invention. Ideally, the distribution architecture of an information router allows for the information to be transported over a variety of transports and it should not impose any particular requirement to use a specific route. Since an information router operates at the identity level, the distribution architecture deals with identities that move to a variety of devices over time.

Intelligent dissemination of information positions information where it is most likely to be needed. For example, a doctor accessing a patient's record on a PDA is likely to want to access the same record from the personal computer in the office. A secure object management router learns usage patterns and automatically disseminates the appropriate information to suitable nodes.

Figure 6:
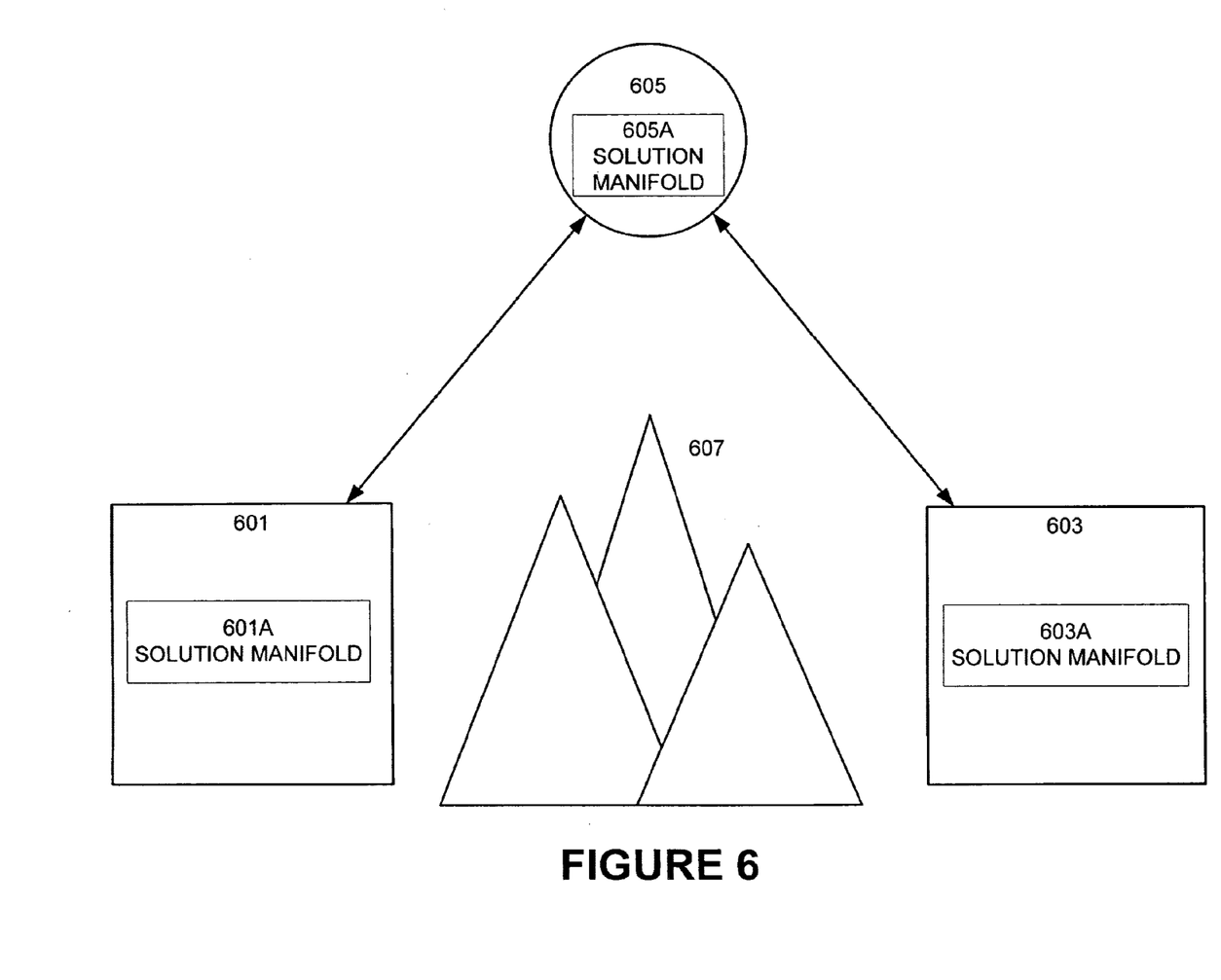
FIG. 6 illustrates an example of smart routing with smart object structures within the signal according to an embodiment of the present invention.

Referring now to FIG. 6, a self organizing network using smart object structure is illustrated according to one embodiment of the present invention. Node 601 comprising solution manifold 601A is sending information to node 603 comprising solution manifold 603A. The information is blocked from passing directly to 603 by terrain features such as mountains 607. An asset owned by a common custodian 605 comprising solution manifold 605A receives the signal from 601 and is able to identify that the public key in the header of the signal sent by 601 belongs to an asset belonging to a common custodian but is unable to read more of the signal intended for identity 603. Instead, 605, utilizing a private key held by 605, opens the routing instructions without compromising the secured signal meant for 603. The routing instructions allow 605 to direct the signal to 603 in an anonymous manner since the identity of 603 and the context of the secure message are still unreadable to 605 in the absence of the private key held by 603. Both the conditions and the rules for routing are encoded with a key held by 601. Solution manifold 601A is able to set the conditions and rules for routing the data to the specific desired node indirectly.

Portable code sample for one embodiment of the present invention is illustrated for one MICA class as illustrated in the Computer Program Listing Appendix 1.

One embodiment of the base 85 characters set is illustrated in the Computer Program Listing Appendix 2.

An adaptive data transformation engine has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A computer-readable device whose contents are adapted to cause a computing system to perform operations, the operations comprising:
    transmitting a data stream and transformation code as separate streams for receipt by a client system, the data stream is encoded using one or more metatags and the transformation code describing manipulation to be performed at points identified by the one or more metatags in the data stream to convert the data stream into transformed information; and
    producing active code that is to be executed as part of the transformation code based on feedback received from the client system, the active code being executable to revise analysis operations performed by a solution manifold through execution of the transformation code.

2. The computer-readable device of claim 1, wherein the transformation code is configured to, in response to being executed, convert the data stream into transformed information in real time as the separate streams that include the data stream and the transformation code are received.

3. The computer-readable device of claim 1, wherein the transmitting is performed such that the data stream is processable using the transformation code in real time.

4. The computer-readable device of claim 1, wherein the transformation code includes at least one partial header that comprises information that describes a frequency at which full headers appear in the transmitted stream of the transformation code.

5. The computer-readable device of claim 4, wherein at least one of the full headers comprises one of: information regarding a version, information regarding routing, and information regarding security permissions.

6. The computer-readable device of claim 4, wherein the full headers indicate points at which data in the data stream is to be read.

7. The computer-readable device of claim 1, wherein the transformation code includes inline stream processing instructions (ISPI).

8. The computer-readable device of claim 1, wherein the transformation code includes a chain of custody fingerprint within an object data structure that identifies where analysis operations in the transformation code were derived.

9. The computer-readable device of claim 1, wherein the transformation code is written in an extensible stream markup language (XSML).

10. The computer-readable device of claim 1, wherein the transformation code or the data stream is written in compliance with Base 85.

11. The computer-readable device of claim 10, wherein a five character block in base 85 maps directly to a 32 bit double word.

12. A system comprising:
    a transmitter configured to transmit a data stream and transformation code as separate streams for receipt by a client system, the data stream is encoded using one or more metatags and the transformation code describing manipulation to be performed at points identified by the one or more metatags in the data stream to convert the data stream into transformed information; and
    a data processor configured to produce active code that is to be executed as part of the transformation code based on feedback received from the client system, the active code being executable to revise analysis operations performed through execution of the transformation code.

13. The system of claim 12, wherein the transformation code is configured, in response to being executed, to convert the data stream into transformed information in real time as the separate streams that include the data stream and the transformation code are received.

14. The system of claim 12, wherein the data stream transmitted by the transmitter includes a first header that comprises information concerning cryptographic traits of a second header in the data stream, the second header comprising license information.

15. The system of claim 12, wherein the data stream transmitted by the transmitter is comprised of a plurality of data objects, each of which is directly associated with a corresponding security policy that is not obtained from a global configuration file.

16. The system of claim 12, wherein the direct association of the plurality of data objects is configured such that a change made to the corresponding security policy of a first said data object of the data stream does not affect the corresponding security policy of a second said data object of the data stream.

17. The system of claim 12, wherein the data stream transmitted by the transmitter is comprised of a plurality of data objects, each of which having an embedded security policy and digital signature.

18. The system of claim 12, wherein the data stream transmitted by the transmitter includes raw streaming data obtained from a plurality of sources and the metatags describe inherent relationships between the data.

19. The system of claim 18, wherein at least one of the inherent relationships is time.

20. A computer-readable device whose contents are adapted to cause a computing system to perform operations, the operations comprising:
    receiving a data stream and transformation code as separate streams from a solution manifold, the data stream is encoded using one or more metatags and the transformation code describing manipulation to be performed at points identified by the one or more metatags in the data stream to convert the data stream into transformed information; and
    providing feedback for receipt by the solution manifold to revise analysis operations performed by the solution manifold, through execution of the transformation code, by producing active code by the solution manifold that is to be executed as part of the transformation code.

21. The computer-readable medium of claim 20, wherein the transformation code is configured to be executed to convert the data stream into transformed information in real time as the separate streams that include the data stream and the transformation code are received.

\* \* \* \* \*